(12) United States Patent
Natu et al.

(10) Patent No.: US 10,218,627 B2
(45) Date of Patent: Feb. 26, 2019

(54) DISAGGREGATED BROADBAND NETWORK GATEWAY FUNCTIONALITY FOR EFFICIENT CONTENT DELIVERY NETWORK PEERING

(71) Applicant: Juniper Networks, Inc., Sunnyvale, CA (US)

(72) Inventors: Sachin S. Natu, Fremont, CA (US); Disha M. Chopra, Union City, CA (US); Paul Lachapelle, Bedford, NH (US); Si Il Rho, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 229 days.

(21) Appl. No.: 15/198,319

(22) Filed: Jun. 30, 2016

(65) Prior Publication Data

US 2018/0006959 A1 Jan. 4, 2018

(51) Int. Cl.
| | |
|---|---|
| *G06F 15/173* | (2006.01) |
| *H04L 12/859* | (2013.01) |
| *H04L 12/26* | (2006.01) |
| *H04L 12/813* | (2013.01) |
| *H04L 29/08* | (2006.01) |
| *H04L 12/24* | (2006.01) |

(52) U.S. Cl.
CPC ...... *H04L 47/2475* (2013.01); *H04L 41/0813* (2013.01); *H04L 43/0882* (2013.01); *H04L 43/0888* (2013.01); *H04L 47/20* (2013.01); *H04L 67/1095* (2013.01); *H04L 67/141* (2013.01); *H04L 43/08* (2013.01); *H04L 43/16* (2013.01)

(58) Field of Classification Search
CPC ..... G06F 21/10; H04L 12/2801; H04L 12/66; H04L 45/302
USPC ......................................................... 709/224
See application file for complete search history.

(56) References Cited

U.S. PATENT DOCUMENTS

| | | | |
|---|---|---|---|
| 2012/0166618 A1* | 6/2012 | Dahod ................. | H04L 12/66 709/224 |
| 2015/0146682 A1* | 5/2015 | Lin ...................... | H04W 24/04 370/331 |
| 2017/0005923 A1* | 1/2017 | Babakian .............. | H04L 69/324 |

OTHER PUBLICATIONS

Extended European Search Report corresponding to EP 16193858, dated Mar. 14, 2017, 7 pages.

* cited by examiner

*Primary Examiner* — Tauqir Hussain
(74) *Attorney, Agent, or Firm* — Harrity & Harrity, LLP

(57) ABSTRACT

A first device may receive information that assigns a function related to network traffic associated with a content delivery network. The first device may implement the function based on the information that assigns the function. The first device may receive the network traffic from the content delivery network and may provide the network traffic to a subscriber device. The first device may provide, to a second device, information associated with the network traffic based on implementing the function. The second device may manage a subscriber session associated with the subscriber device based on the information associated with the network traffic.

20 Claims, 6 Drawing Sheets

DISAGGREGATED BROADBAND NETWORK GATEWAY FUNCTIONALITY FOR EFFICIENT CONTENT DELIVERY NETWORK PEERING

BACKGROUND

A broadband network gateway (BNG) routes traffic to and from broadband remote access devices, such as digital subscriber line access multiplexers (DSLAMs), on an Internet service provider (ISP) network. The BNG enables subscribers to connect to the broadband network, and performs authentication, authorization, and accounting, assigns internet protocol (IP) addresses, enforces quality of service (QoS) policies, etc.

SUMMARY

According to some possible implementations, a first device may include one or more processors to receive, from a second device, information that assigns a function related to network traffic associated with a content delivery network and a subscriber device. The first device may be associated with a metropolitan area network, and may be associated with an Ethernet virtual private network configuration. The second device may be associated with an Internet service provider network. The one or more processors may implement the function with regard to the network traffic based on the information that assigns the function. The first device may receive the network traffic from the content delivery network, and may provide the network traffic to the subscriber device. The one or more processors may provide, to the second device, information associated with the network traffic based on implementing the function. The second device may manage a subscriber session based on the information associated with the network traffic.

According to some possible implementations, a non-transitory computer-readable medium may store one or more instructions that, when executed by one or more processors of a first device, cause the one or more processors to receive, from a second device, information that assigns a function related to network traffic associated with a subscriber device. The first device may be associated with a metropolitan area network. The second device may be associated with an Internet service provider network that is different than the metropolitan area network. The one or more instructions may cause the one or more processors to implement the function in association with the network traffic based on the information that assigns the function. The first device may provide the network traffic to the subscriber device. The network traffic may not be provided via the Internet service provider network. The one or more instructions may cause the one or more processors to provide, to the second device, information associated with the network traffic based on implementing the function.

According to some possible implementations, a method may include receiving, by a first device, information that assigns a function related to network traffic associated with a content delivery network. The method may include implementing, by the first device, the function based on the information that assigns the function. The first device may receive the network traffic from the content delivery network. The first device may provide the network traffic to a subscriber device. The method may include providing, by the first device and to a second device, information associated with the subscriber device based on the information associated with the network traffic.

DETAILED DESCRIPTION

The following detailed description of example implementations refers to the accompanying drawings. The same reference numbers in different drawings may identify the same or similar elements.

A metropolitan area network (MAN), such as a metro Ethernet network, may transport network traffic between a BNG device and customer premises equipment (CPE) devices. Typically, a metro Ethernet network may be constructed as a Layer 2 network in the Open Systems Interconnection reference model, and may implement a virtual private local area network service (VPLS). Additionally, network devices of the metro Ethernet network may employ Layer 2 switching, which allows packets to be switched based on a media access control (MAC) address of a destination device.

The BNG device may represent an access point to the ISP network for subscribers, and may implement particular functionality associated with network traffic related to a subscriber. For instance, the BNG device may authenticate a subscriber's credentials, validate the subscriber's access policies, store accounting information, or the like. Thus, if network traffic is provided to CPE devices in a manner that bypasses the BNG device, then a network operator may be required to reconfigure network devices based on the distributed architecture (e.g., to communicate with a back end system to account for the bypass network traffic).

Implementations described herein may enable network devices associated with a MAN to advertise MAC and IP address reachability information associated with subscriber devices based on an Ethernet virtual private network (EVPN) configuration. Additionally, implementations described herein may enable a network device, associated with a MAN, to peer with a content delivery network (CDN) device and provide network layer reachability information (NLRI) to the CDN device, thereby enabling content to be delivered to a subscriber device using a shorter path than as compared to a path through an ISP network. Thus, implementations described herein may conserve network resources by enabling network traffic (e.g., over the top (OTT) network traffic) to be delivered from a closer geographic location and/or enabling network traffic to bypass data centers associated with BNG devices. Additionally, implementations described herein may enable a network device to provide, to the BNG device, information associated with network traffic that bypasses the BNG device. In this way, implementations described herein may enable disaggregated BNG functionality while enabling the BNG device to retain visibility and control of network traffic associated with a sub scriber.

Figure 1A:
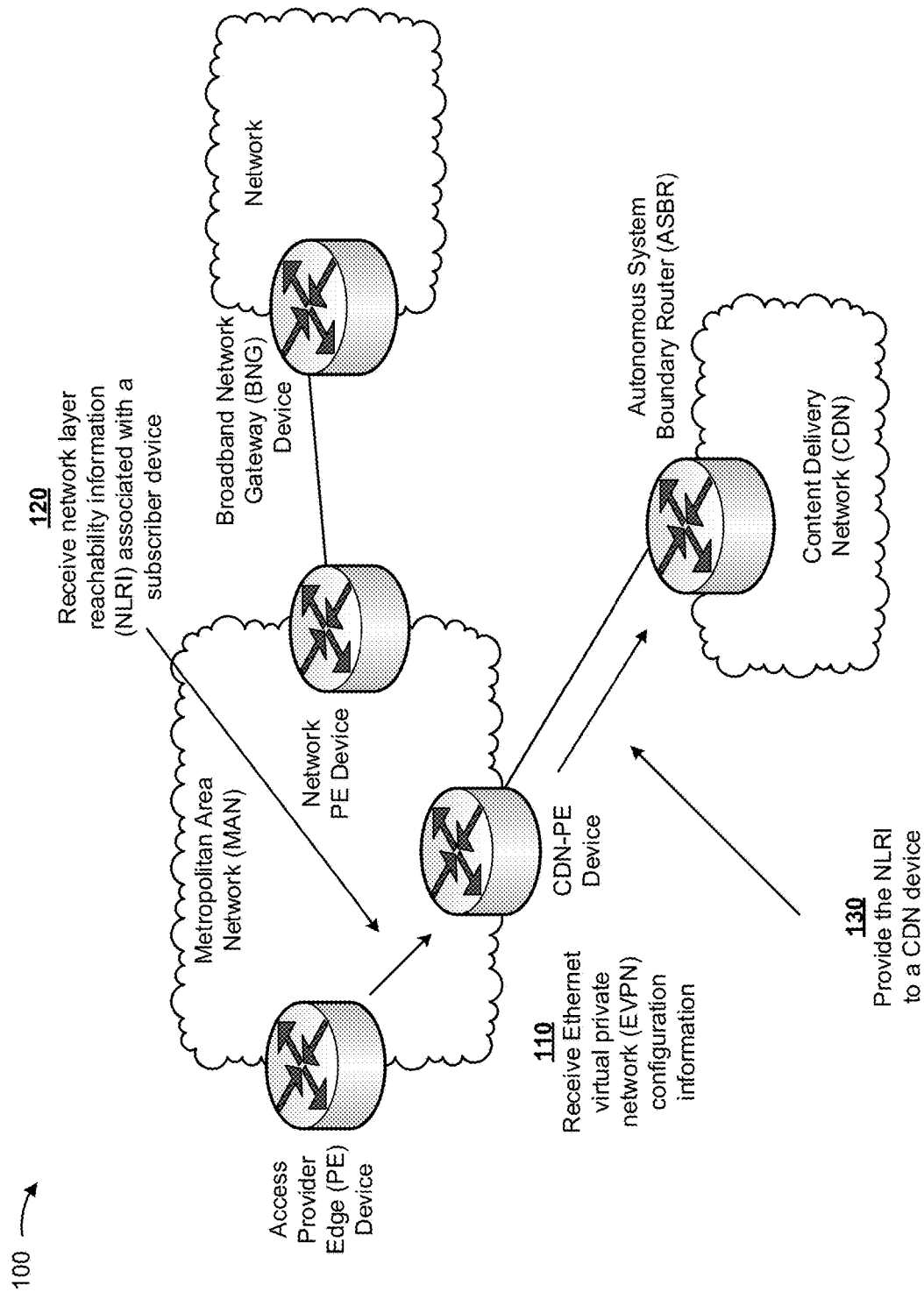
FIGS. 1A-1C are diagrams of an overview of an example implementation described herein.
Figure 1B:
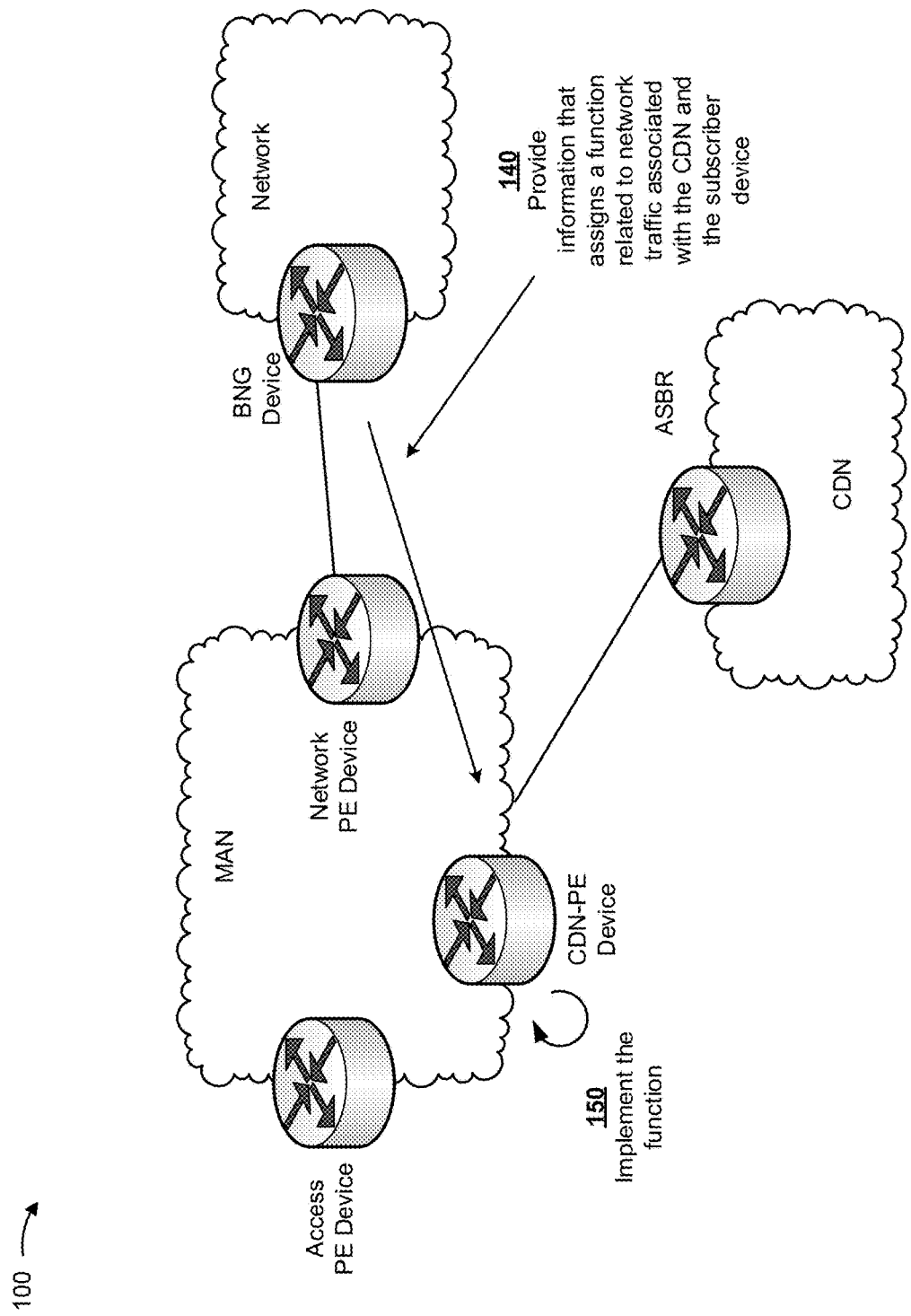
Figure 1C:
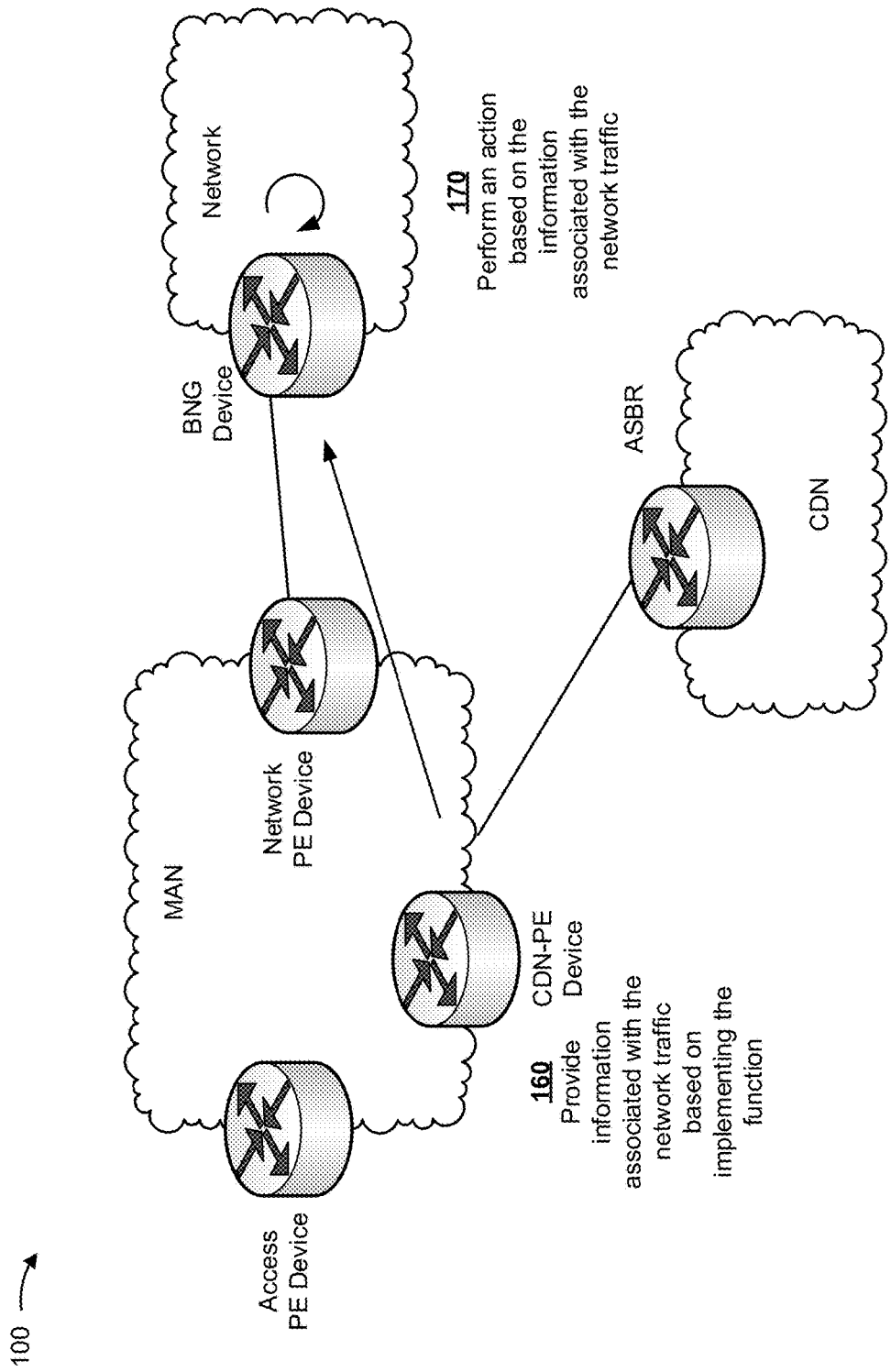

FIGS. 1A-1C are diagrams of an overview of an example implementation 100 described herein. As shown in FIG. 1A, and by reference number 110, a CDN-provider edge (PE) device may receive EVPN configuration. For example, a network operator may configure network devices associated with a MAN (e.g., an access PE device, a CDN-PE device, and/or a network PE device) with EVPN configuration information. As shown by reference number 120, the CDN-PE device may receive NLRI associated with a subscriber device. For example, network devices associated with the MAN may exchange route information (e.g., MAC/IP advertisement routes, or the like) based on the EVPN configuration information. As shown by reference number 130, the CDN-PE device may provide the NLRI to a CDN device. For example, as shown, the CDN-PE device may establish an external border gateway protocol (eBGP) peering session with an autonomous system boundary router (ASBR), and may exchange routing information based on the peering session.

As shown in FIG. 1B, and by reference number 140, a BNG device may provide, to the CDN-PE device, information that assigns a function related to network traffic associated with the CDN and the subscriber device. For example, the BNG device may establish a communication session (e.g., an access node control protocol (ANCP) session) with the CDN-PE device, and may provide information that assigns a function based on the communication session. In some implementations, the function may include implementing a QoS policy (e.g., ensuring that network traffic does not exceed a particular bandwidth usage value), providing accounting information (e.g., a byte count associated with the network traffic), and/or providing mirrored network traffic, as described elsewhere herein.

As further shown in FIG. 1B, and by reference number 150, the CDN-PE device may implement the function in association with network traffic associated with the CDN and the subscriber device. For example, the CDN-PE device may receive, from the ASBR associated with the CDN, network traffic to be provided to a subscriber device. In some implementations, the CDN-PE device may receive the network traffic, and may implement the QoS policy, may monitor network traffic and provide accounting information to the BNG device, and/or may provide mirrored network traffic to the BNG device, as described elsewhere herein. In this way, the BNG device may assign, to the CDN-PE device, a function to account for the bypass network traffic (e.g., network traffic that does not traverse a network associated with the BNG device, such as an ISP network).

As shown in FIG. 1C, and by reference number 160, the CDN-PE device may provide, to the BNG device, information associated with the network traffic based on implementing the function. For example, the CDN-PE device may provide information that identifies a bandwidth usage value associated with the network traffic, may provide information that identifies a byte count associated with the network traffic, may provide mirrored network traffic, or the like, as described elsewhere herein. As shown by reference number 170, the BNG device may perform an action based on the information associated with the network traffic. For example, the BNG device may adjust a bandwidth usage value of other network traffic (e.g., that traverses the ISP network) associated with the subscriber device (e.g., to account for the network traffic provided by the CDN-PE device), may determine statistical information (e.g., a packet count, a byte count, etc.) associated with the network traffic, may encapsulate mirrored network traffic and provide the encapsulated network traffic to a mediation device (e.g., to perform a lawful intercept function), or the like, as described elsewhere herein.

Implementations described herein may enable network devices, associated with a MAN, to exchange Layer 3 reachability information, and advertise the Layer 3 reachability information to CDN devices. In this way, subscriber devices may receive network traffic, associated with content provider devices, without requiring that the network traffic traverse an ISP network. In this way, content may be delivered to subscriber devices from a closer geographic location than as compared to a POP associated with an ISP network, thereby conserving network resources.

Additionally, implementations described herein may enable a BNG device to assign a function to a CDN-PE device, and establish a communication session with the CDN-PE device. Additionally, implementations described herein may enable the BNG device to receive information associated with the network traffic based on the communication session. In this way, implementations described herein may enable disaggregated BNG functionality while allowing a BNG device to maintain visibility of network traffic associated with a subscriber, thereby enabling the BNG to monitor subscriber sessions.

As indicated above, FIGS. 1A-1C are provided merely as an example. Other examples are possible and may differ from what was described with regard to FIGS. 1A-1C.

Figure 2:
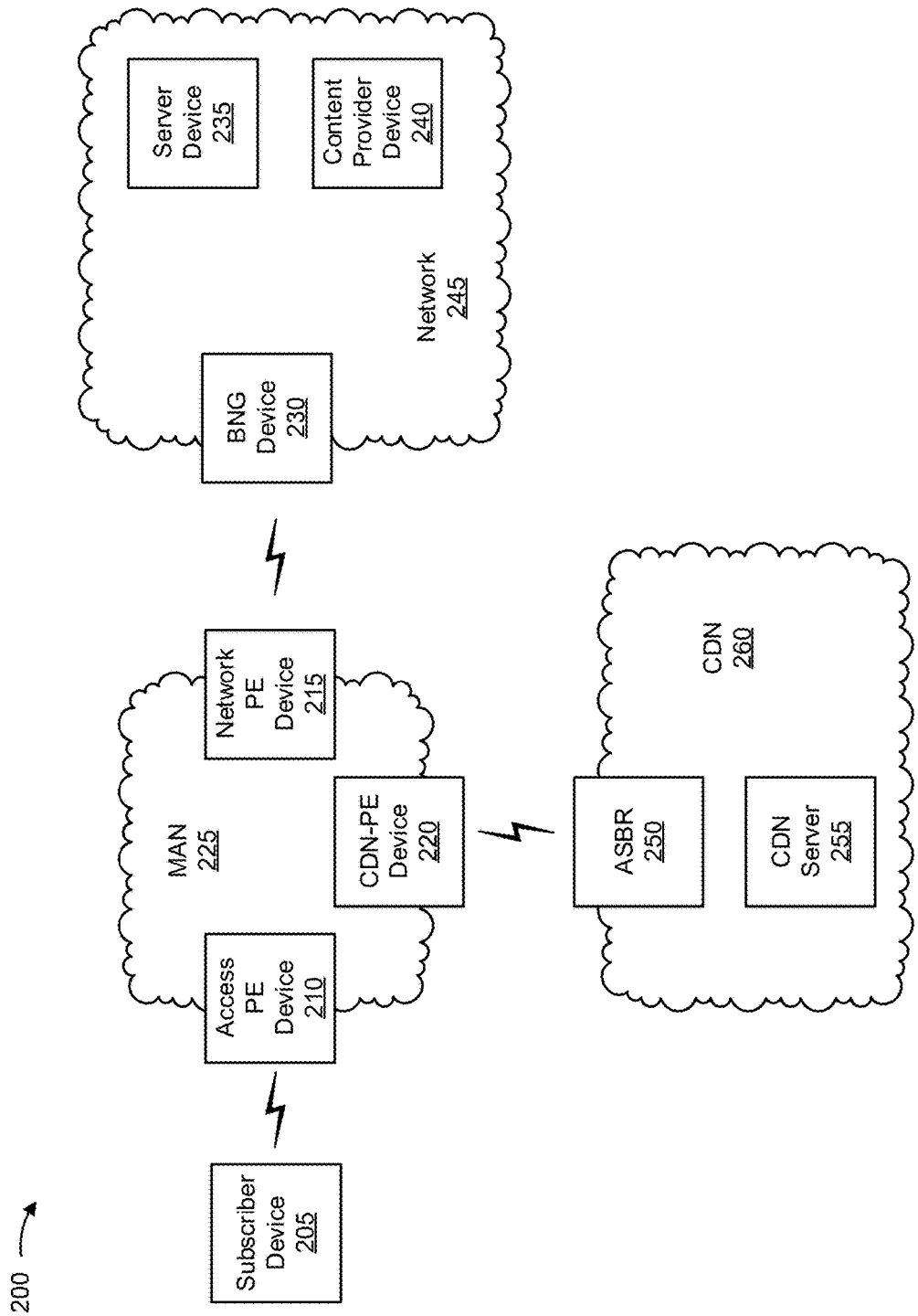
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a subscriber device 205, an access PE device 210, a network PE device 215, a CDN-PE device 220, a MAN 225, a BNG device 230, a server device 235, a content provider device 240, a network 245, an ASBR 250, a CDN server 255, and a CDN 260. Devices of environment 200 may interconnect via wired connections, wireless connections, or a combination of wired and wireless connections.

Subscriber device 205 includes one or more devices capable of receiving, generating, storing, processing, and/or providing information associated with content. For example, subscriber device 205 may include a communication and computing device and/or a consumer premises equipment (CPE) device, such as a router, a gateway, a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), a set-top box, or a similar type of device. In some implementations, subscriber device 205 may provide and/or receive network traffic to and/or from BNG device 230 via multiservice access node (MSAN) devices, such as DSLAMs, optical line termination (OLT) devices, or the like.

Access PE device 210 includes one or more network devices (e.g., one or more traffic transfer devices) capable of processing and transferring network traffic (e.g., packets). For example, access PE device 210 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, access PE device 210 may connect to MSAN devices, and may receive network traffic associated with subscriber device 205.

As used herein, a packet may refer to a communication structure for communicating information, such as a protocol data unit (PDU), a network packet, a frame, a datagram, a segment, a message, a block, a cell, a frame, a subframe, a slot, a symbol, a portion of any of the above, and/or another type of formatted or unformatted unit of data capable of being transmitted via a network.

Network PE device 215 includes one or more network devices (e.g., one or more traffic transfer devices) capable of processing and transferring network traffic. For example, network PE device 215 may include a router, a gateway, a switch, or a similar type of device. In some implementations, network PE device 215 may provide network traffic, associated with MAN 225, to BNG device 230.

CDN-PE device 220 includes one or more network devices (e.g., one or more traffic transfer devices) capable of processing and transferring network traffic. For example, CDN-PE device 220 may include a router, a gateway, a switch, a line card (e.g., in a chassis-based system), or a similar type of device. In some implementations, CDN-PE device 220 may establish an eBGP peering session with ASBR 250, and may provide network traffic, associated with CDN 260, to subscriber device 205. Additionally, CDN-PE device 220 may establish an ANCP communication session with BNG device 230, and may provide information associated with network traffic to BNG device 230.

MAN 225 includes one or more wired and/or wireless networks. For example, MAN 225 may include a network of devices that may connect subscriber device 205 to network 245. In some implementations, MAN 225 may include access PE device 210, network PE device 215, and/or CDN-PE device 220. Additionally MAN 225 may connect subscriber device 205 to network 245 and/or CDN 260.

BNG device 230 includes one or more network devices (e.g., one or more traffic transfer devices) capable of processing and transferring network traffic. For example, BNG device 230 may include a router, a gateway, a switch, a firewall, a hub, a bridge, a reverse proxy, a server (e.g., a proxy server, a broadband remote access server, a server executing a virtual machine, etc.), a security device, an intrusion detection device, a load balancer, a line card (e.g., in a chassis-based system), or a similar type of device. In some implementations, BNG device 230 may provide an access point for subscriber device 205 to network 245. Additionally, or alternatively, BNG device 230 may manage subscriber sessions, may perform authentication, authorization, and accounting of subscriber sessions, may implement a QoS policy, and/or may provide lawful intercept functionality.

Server device 235 includes one or more devices capable of receiving, processing, storing, and/or providing information associated with a subscriber. For example, server device 235 may include a computing device, such as a server (e.g., a remote authentication dial-in user service (RADIUS) server, a mediation server, an authentication, authorization, and accounting server, an application server, a host server, a web server, a hypertext transfer protocol (HTTP) server, etc.), a network device, or a similar device. In some implementations, server device 235 may receive, from BNG device 230, information associated with network traffic related to subscriber device 205.

Content provider device 240 includes one or more devices capable of receiving, processing, storing, and/or providing information associated with content. For example, content provider device 240 may include a computing device, such as a server (e.g., an application server, a host server, a web server, an HTTP server, etc.), a network device, or a similar device. In some implementations, content provider device 240 may receive, from subscriber device 205, a request for content, and may provide network traffic associated with the content to subscriber device 205. Additionally, or alternatively, content provider device 240 may provide content to CDN server 255, and CDN server 255 may provide network traffic associated with the content to subscriber device 205.

Network 245 includes one or more wired and/or wireless networks. For example, network 245 may include a wide area network (WAN), a MAN, a telephone network (e.g., the Public Switched Telephone Network (PSTN)), a cellular network, a private network, an ad hoc network, an intranet, the Internet, a fiber optic-based network, a cloud computing network, or the like, and/or a combination of these or other types of networks.

ASBR 250 includes one or more devices capable of receiving and/or providing network traffic. For example, ASBR 250 may include a traffic transfer device, such as a router, a routing component, a switch, a gateway, a firewall, a hub, a bridge, a reverse proxy, a server (e.g., a proxy server, a server executing a virtual machine, etc.), a security device, an intrusion detection device, a load balancer, or a similar device. In some implementations, ASBR 250 may establish an eBGP peering session with CDN-PE device 220, and may provide network traffic to CDN-PE device 220.

CDN server 255 includes one or more devices capable of receiving, processing, storing, and/or providing information associated with content. For example, CDN server 255 may include a computing device, such as a server (e.g., an application server, a host server, a web server, an HTTP server, etc.), a network device, or a similar device. In some implementations, CDN server 255 may provide network traffic to CDN-PE device 220 (e.g., via ASBR 250).

CDN 260 includes one or more wired and/or wireless networks of devices that are capable of receiving, storing, processing, and/or providing content. CDN 260 may include, for example, servers, data centers, or the like. In some implementations, CDN 260 may include ASBR 250 and/or CDN server 255. One or more devices of CDN 260 may receive content from content provider device 240, and may provide the content to subscriber device 205.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
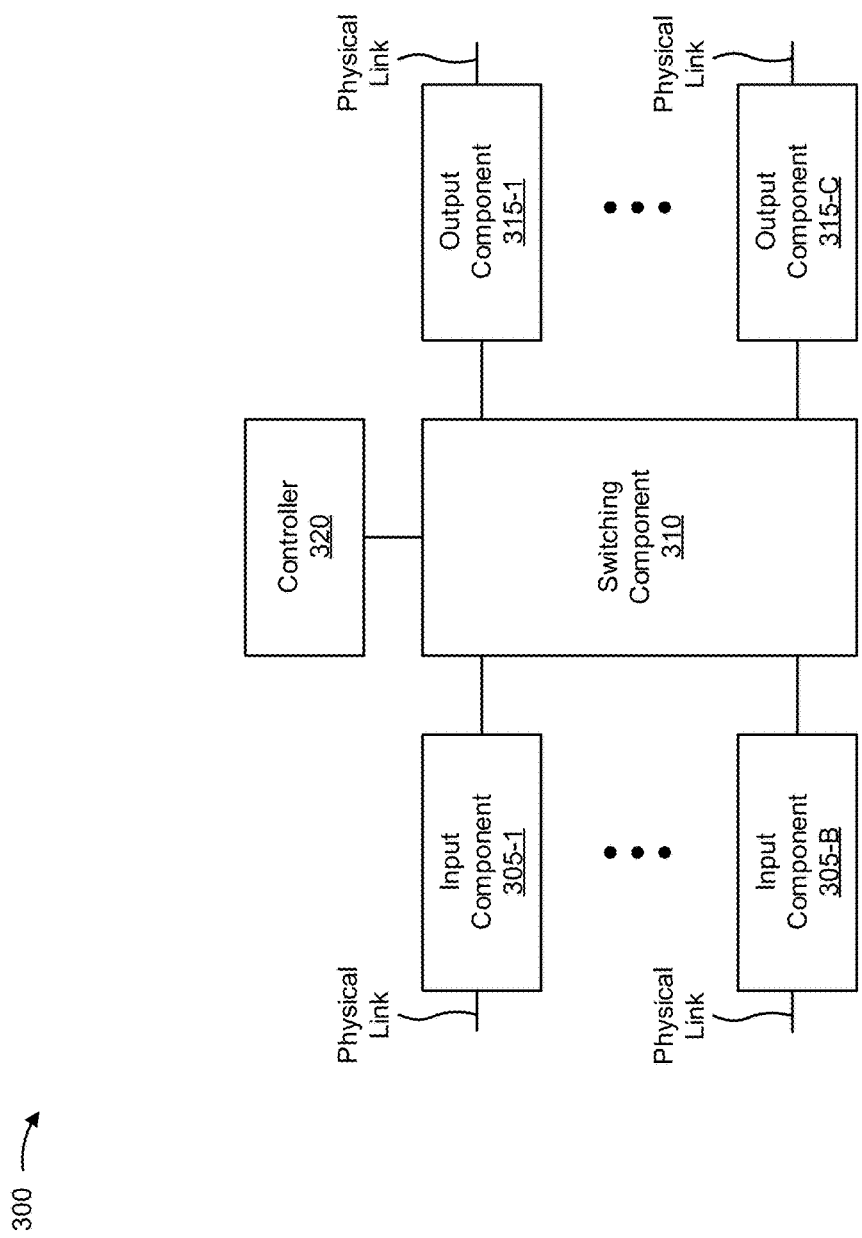
FIG. 3 is a diagram of example components of one or more devices of FIG. 2.

FIG. 3 is a diagram of example components of a device 300. Device 300 may correspond to subscriber device 205, access PE device 210, network PE device 215, CDN-PE device 220, BNG device 230, server device 235, content provider device 240, ASBR 250, and/or CDN server 255. In some implementations, subscriber device 205, access PE device 210, network PE device 215, CDN-PE device 220, BNG device 230, server device 235, content provider device 240, ASBR 250, and/or CDN server 255 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C(C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor that can interpret and/or execute instructions. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
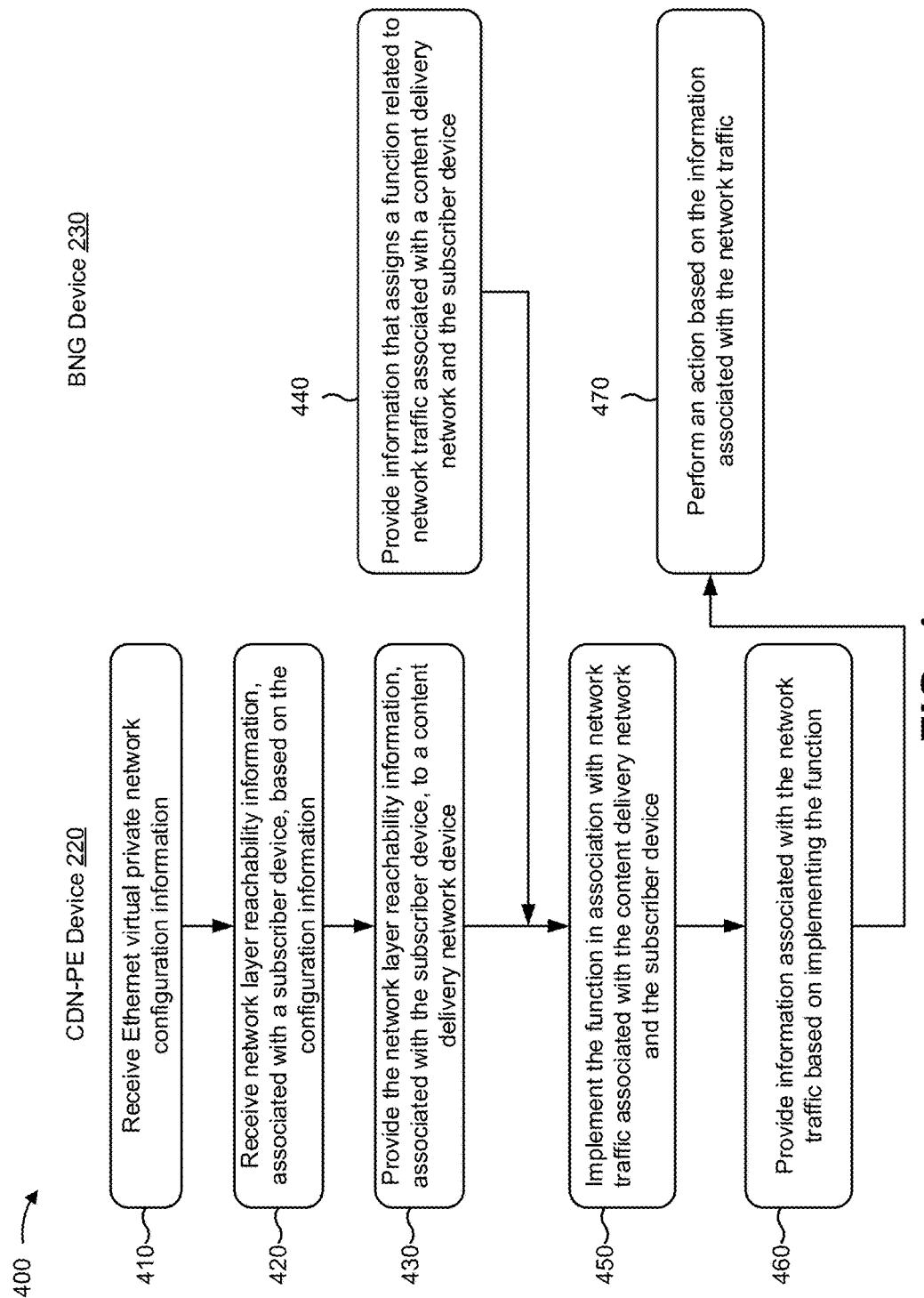
FIG. 4 is a flow chart of an example process for enabling disaggregated broadband network gateway functionality.

FIG. 4 is a flow chart of an example process 400 for enabling disaggregated broadband network gateway functionality. In some implementations, one or more process blocks of FIG. 4 may be performed by CDN-PE device 220 and/or BNG device 230. In some implementations, one or more process blocks of FIG. 4 may be performed by another device or a group of devices separate from or including CDN-PE device 220 and/or BNG device 230, such as subscriber device 205, access PE device 210, network PE device 215, server device 235, content provider device 240, ASBR 250, and/or CDN server 255.

As shown in FIG. 4, process 400 may include receiving Ethernet virtual private network configuration information (block 410), and receiving network layer reachability information, associated with a subscriber device, based on the configuration information (block 420). For example, CDN-PE device 220 may receive EVPN configuration information, and may receive NLRI, associated with subscriber device 205, based on the EVPN configuration information. In some implementations, access PE device 210, network PE device 215, and/or CDN-PE device 220 may receive EVPN configuration information (e.g., based on input from a network operator), and may constitute an EVPN instance (EVI).

In some implementations, access PE device 210, network PE device 215, and/or CDN-PE device 220 may execute the EVPN protocol within respective control planes (e.g., routing engines) based on the EVPN configuration information. Additionally, or alternatively, access PE device 210, network PE device 215, and/or CDN-PE device 220 may exchange route information (e.g., may advertise NLRI using multiprotocol border gateway protocol (MP-BGP) messages), based on receiving the EVPN configuration information and/or executing the EVPN protocol. For example, access PE device 210, network PE device 215, and/or CDN-PE device 220 may exchange route information, such as Ethernet auto-discovery routes (e.g., route type 1), MAC/IP advertisement routes (e.g., route type 2), inclusive multicast Ethernet tag routes (e.g., route type 3), Ethernet segment routes (e.g., route type 4), IP prefix routes (e.g., route type 5), or the like.

In some implementations, the NLRI may be associated with subscriber device 205 (e.g., associated with a particular subscriber). For example, access PE device 210 may receive NLRI associated with subscriber device 205, and may advertise the NLRI to network PE device 215 and/or CDN-PE device 220. In some implementations, access PE device 210 may execute a routing protocol within a control plane, and may update a routing table with an IP prefix associated with subscriber device 205. Additionally, or alternatively, access PE device 210 may provide a message (e.g., an EVPN message) that advertises that subscriber device 205 is reachable via access PE device 210. Additionally, or alternatively, CDN-PE device 220 may receive the message, and may determine that subscriber device 205 is reachable via access PE device 210. In this way, CDN-PE device 220 may receive NLRI, and may advertise the NLRI to ASBR 250, as described below.

As further shown in FIG. 4, process 400 may include providing the NLRI, associated with the subscriber device, to a content delivery network device (block 430). For example, CDN-PE device 220 may provide the NLRI, associated with subscriber device 205, to ASBR 250. In some implementations, CDN-PE device 220 may receive configuration information, and may establish a peering session with ASBR 250 based on the configuration information (e.g., an eBGP peering session).

In some implementations, CDN-PE device 220 may include one or more inter-autonomous system (AS) links with ASBR 250. For example, an inter-AS link may directly or indirectly connect an interface associated with CDN-PE device 220 with an interface of ASBR 250. In some implementations, CDN-PE device 220 and ASBR 250 may exchange routing information via an inter-AS link. For example, CDN-PE device 220 may provide, to ASBR 250, routing information (e.g., a BGP UPDATE message) that advertises CDN-PE device 220 as a next-hop to a prefix (e.g., an IP address prefix). Additionally, a BGP message may include one or more prefixes (e.g., associated with an NLRI field), and/or one or more interface addresses of CDN-PE device 220 (e.g., associated with a path attribute field). In this way, an entity (e.g., a content provider associated with content provider device 240 and/or CDN server 255) may implement a technique (e.g., egress peer engineering (EPE)) to provide content to subscriber device 205 via CDN 260 and/or via a cache device (not shown) associated with MAN 225 instead of network 245 (e.g., bypassing BNG device 230).

As further shown in FIG. 4, process 400 may include providing information that assigns a function related to network traffic associated with a content delivery network and the subscriber device (block 440). For example, BNG device 230 may provide, to CDN-PE device 220, information that assigns a function related to network traffic associated with CDN 260 and subscriber device 205.

In some implementations, BNG device 230 may establish a connection with subscriber device 205 (e.g., allowing subscriber device 205 to access broadband services provided by a service provider). Additionally, or alternatively, BNG device 230 may establish and manage subscriber sessions, and may implement functionality in association with network traffic related to subscriber device 205. For example, BNG device 230 may perform authentication, authorization, and accounting of subscriber sessions (e.g., authenticate subscriber device 205 before establishing a subscriber session, authorize subscriber device 205 to access services or resources associated with network 245, track usage of broadband services for accounting and/or billing, etc.). Additionally, or alternatively, BNG device 230 may assign an IP address to subscriber device 205, and/or may implement a security measure (e.g., dynamic host configuration protocol (DHCP) snooping feature, or the like).

Additionally, or alternatively, BNG device 230 may implement a QoS policy. For example, BNG device 230 may perform network traffic policing (e.g., may ensure that network traffic, associated with a particular subscriber device 205 and/or a particular class, does not exceed a particular bandwidth usage), may queue priority network traffic for prioritized transmission, and/or may perform network traffic shaping. In some implementations, BNG device 230 may adjust a bandwidth usage of particular network traffic, associated with subscriber device 205, based on a type of network traffic (e.g., streaming media traffic, voice over IP (VoIP) traffic, Internet Protocol Security (IPsec) traffic, teleconference traffic, or the like). Additionally, or alternatively, BNG device 230 may adjust a bandwidth usage of particular network traffic based on a priority indicator included in a packet (e.g., a class of service (CoS) value, a QoS value, a priority code point (PCP) value, a differentiated services code point (DSCP) value, an internal forwarding class value, a type of service (ToS) value, an experimental (EXP) bit value, or the like).

In some implementations, BNG device 230 may provide, to CDN-PE device 220, information that assigns a function related to network traffic associated with CDN 260 and subscriber device 205. For example, BNG device 230 may provide, to CDN-PE device 220, one or more instructions associated with a function, thereby causing CDN-PE device 220 to implement the function. In some implementations, BNG device 230 and CDN-PE device 220 may establish a communication session (e.g., an ANCP session, or the like). For example, BNG device 230 and CDN-PE device 220 may establish a communication session based on configuration information (e.g., a network operator may configure BNG device 230 and CDN-PE device 220), and may exchange messages (e.g., ANCP adjacency messages) based on the communication session.

In some implementations, the communication session may be associated with a particular subscriber device 205 (e.g., associated with a particular subscriber). Additionally, or alternatively, the communication session may include a session identifier (e.g., a device identifier associated with subscriber device 205 (e.g., an IP address), an EVI identifier, a VPN routing and forwarding table (VRF) identifier, or the like). In some implementations, BNG device 230 may establish the communication session based on receiving NLRI from CDN-PE device 220. In this way, BNG device 230 may determine that CDN-PE device 220 may provide network traffic to subscriber device 205, and may assign a function based on determining that CDN-PE device 220 may provide the network traffic.

In some implementations, the function may be associated with implementing a QoS policy. For example, the function may include implementing a bandwidth usage limit for a particular type of network traffic, for network traffic including a particular priority indicator, or the like. In some implementations, BNG device 230 may provide an instruction that identifies a maximum bandwidth usage limit value associated with network traffic related to subscriber device 205, and/or associated with a type of network traffic, a priority indicator associated with the network traffic, or the like.

Additionally, or alternatively, BNG device 230 may provide an instruction for CDN-PE device 220 to mark the network traffic with a particular priority indicator value (e.g., set or change a CoS value, an EXP value, or the like). Additionally, or alternatively, BNG device 230 may provide an instruction for CDN-PE device 220 to provide statistical information, associated with the network traffic, to BNG device 230 at a particular time interval. In some implementations, statistical information may include a bandwidth usage value (e.g., a maximum bandwidth usage value, a minimum bandwidth usage value, an average bandwidth usage value, or the like), a network metric value (e.g., a packet loss value, a latency value, a jitter value, etc.), or the like.

In some implementations, the function may be associated with providing accounting information. For example, BNG device 230 may provide an instruction for CDN-PE device 220 to provide, at a particular time interval, statistical information (e.g., a byte count, a packet count, or the like) associated with network traffic related to subscriber device 205. In some implementations, the time interval may include a particular time frame, a period of time associated with a subscriber session, or the like.

In some implementations, the function may be associated with providing mirrored network traffic (e.g., CDN-PE device 220 may copy packets and provide the copied packets to BNG device 230). For example, BNG device 230 may provide an instruction for CDN-PE device 220 to provide mirrored network traffic to BNG device 230 for lawful intercept purposes. For example, lawful intercept may refer to a process whereby an agency (e.g., a law enforcement agency) may conduct surveillance of communications associated with a subscriber pursuant to a judicial or administrative order. In some implementations, BNG device 230 may provide an instruction for CDN-PE device 220 to provide mirrored network traffic for a particular time frame (e.g., a time frame as prescribed by an order).

In this way, BNG device 230 may provide one or more instructions to CDN-PE device 220 that may cause CDN-PE device 220 to implement a function in association with network traffic to be provided to subscriber device 205, as described below.

As further shown in FIG. 4, process 400 may include implementing the function in association with network traffic associated with the content delivery network and the subscriber device (block 450), and providing information associated with the network traffic based on implementing the function (block 460). For example, CDN-PE device 220 may implement the function in association with network traffic associated with CDN 260 and subscriber device 205, and may provide information to BNG device 230 based on implementing the function. In some implementations, CDN-PE device 220 may receive, from CDN server 255 via ASBR 250, network traffic to be provided to subscriber device 205. Alternatively, CDN-PE device 220 may receive, from a server device (not shown) associated with MAN 225, network traffic to be provided to subscriber device 205. For example, a server device associated with a content provider (e.g., associated with content provider device 240 and/or CDN server 255) may store content (e.g., cache content), and may provide the content to CDN-PE device 220. In some implementations, subscriber device 205 may provide, to content provider device 240, a request for content. Additionally, CDN server 255, and/or a server device associated with MAN 225 may provide network traffic to subscriber device 205 based on the request.

In some implementations, CDN-PE device 220 may implement the QoS policy. For example, CDN-PE device 220 may adjust a bandwidth usage value associated with a flow. A flow may include a sequence of packets that include one or more shared values. For example, each packet associated with a flow may include a common five-tuple in the packer header (e.g., a source address, a source port identifier, a destination address, a destination port identifier, and/or a protocol identifier). Additionally, or alternatively, the flow may include a sequence of packets that are associated with CDN server 255 and subscriber device 205.

In some implementations, CDN-PE device 220 may adjust a bandwidth usage value of a flow associated with subscriber device 205 and CDN server 255. For example, CDN-PE device 220 may receive, from CDN server 255, network traffic associated with a flow, and may provide the network traffic to subscriber device 205. Additionally, CDN-PE device 220 may monitor a bandwidth usage value associated with the flow, and may limit a transmit rate based on a bandwidth usage limit value (e.g., provided by BNG device 230).

In some implementations, CDN-PE device 220 may identify network traffic associated with the flow, and may mark the network traffic with a particular priority indicator value (e.g., a CoS value, an EXP value, or the like). Additionally, or alternatively, CDN-PE device 220 may monitor network traffic associated with the flow, and may determine statistical information associated with the flow. For example, CDN-PE device 220 may determine bandwidth usage values, network metric values, or the like. In some implementations, CDN-PE device 220 may provide, to BNG device 230, information that identifies the bandwidth usage values, network metric values, or the like. For example, CDN-PE device 220 may provide the information to BNG device 230 at a particular time interval. In this way, BNG device 230 may receive the information, and may perform an action, as described elsewhere herein.

In some implementations, CDN-PE device 220 may determine accounting information, and may provide the accounting information to BNG device 230. For example, CDN-PE device 220 may determine statistical information associated with the network traffic (e.g., a packet count, a byte count, etc.), and may provide the statistical information to BNG device 230 for accounting purposes. In some implementations, CDN-PE device 220 may receive network traffic associated with the flow, and may store statistical information in a data structure (e.g., a flow table, or the like). Additionally, or alternatively, as CDN-PE device 220 receives additional packets associated with the flow, CDN-PE device 220 may update the flow table (e.g., update a packet count associated with the flow, a byte count associated with the flow, a duration of the flow, or the like). Additionally, or alternatively, CDN-PE device 220 may provide, to BNG device 230, statistical information at a particular time interval. In this way, BNG device 230 may receive the statistical information, and may perform an action, as described elsewhere herein.

In some implementations, CDN-PE device 220 may provide mirrored network traffic, associated with the flow, to BNG device 230. For example, CDN-PE device 220 may receive network traffic associated with the flow, may copy packets, and may provide the copied packets to BNG device 230. Additionally, CDN-PE device 220 may provide the mirrored network traffic to BNG device 230 for a particular time frame (e.g., provided by BNG device 230). In this way, BNG device 230 may receive the mirrored network traffic, and may perform an action, as described elsewhere herein.

As further shown in FIG. 4, process 400 may include performing an action based on the information associated with the network traffic (block 470). For example, BNG device 230 may receive, from CDN-PE device 220, the information associated with the network traffic, and may perform an action based on the information. In some implementations, BNG device 230 may perform an action, such as adjusting a bandwidth usage value, providing accounting information to server device 235, and/or providing encapsulated network traffic to server device 235.

In some implementations, BNG device 230 may adjust a bandwidth usage value of other network traffic related to subscriber device 205 based on statistical information associated with the flow. For example, BNG device 230 may implement a QoS policy, and may ensure that network traffic associated with subscriber device 205 does not exceed a particular bandwidth usage value. Additionally, BNG device 230 may account for a bandwidth usage associated with the flow, and may limit a transmit rate of other network traffic associated with subscriber device 205 based on the bandwidth usage value associated with the flow. For example, BNG device 230 may receive other network traffic to provide to subscriber device 205, and may account for the bandwidth usage value of the flow (e.g., between CDN server 255 and subscriber device 205) when providing the other network traffic to subscriber device 205.

In some implementations, BNG device 230 may adjust a bandwidth usage limit value based on the statistical information, and may provide, to CDN-PE device 220, information that identifies the adjusted bandwidth usage limit value. As an example, assume that BNG device 230 provides a first bandwidth usage limit value to CDN-PE device 220. Additionally, assume that particular network metric values (e.g., packet loss values, latency values, etc.) and/or bandwidth usage values are associated with the first bandwidth usage limit value. For example, assume that the network metric values and/or bandwidth usage values satisfy threshold values. In this case, BNG device 230 may determine a second bandwidth usage limit value (e.g., that is greater than the first bandwidth usage limit value), and may provide information that identifies the second bandwidth usage value limit to CDN-PE device 220. Alternatively, BNG device 230 may decrease a bandwidth usage limit value based on the statistical information (e.g., in the event that network metric values and/or bandwidth usage values do not satisfy threshold values).

In some implementations, BNG device 230 may provide, to server device 235 (e.g., a RADIUS server), statistical information associated with the flow. For example, BNG device 230 may provide a packet count associated with the flow, a byte count associated with the flow, a duration associated with the flow, or the like. In this way, server device 235 may receive the statistical information, and may update an account associated with a subscriber (e.g., based on network usage).

In some implementations, BNG device 230 may provide, to server device 235 (e.g., a mediation device), encapsulated network traffic associated with the flow. For example, BNG device 230 may receive, from CDN-PE device 220, mirrored network traffic associated with the flow, and may encapsulate (e.g., insert lawful intercept information to a packet header) the mirrored network traffic. Additionally, BNG device 230 may provide, to server device 235, the encapsulated network traffic. In this way, BNG device 230 may retain visibility into network traffic associated with subscriber device 205 (e.g., that bypasses BNG device 230), and may provide information associated with the network traffic to server device 235.

Implementations described herein may enable CDN-PE device 220 to receive NLRI, and advertise the NLRI to ASBR 250. In this way, CDN server 255 may provide network traffic to subscriber device 205, thereby reducing a quantity of network traffic that is provided to subscriber device via network 245 and thereby conserving network resources. Additionally, implementations described herein may enable CDN-PE device 220 to implement particular functions related to network traffic, and provide information to BNG device 230 based on implementing the particular functions. In this way, BNG device 230 may receive the information (e.g., associated with network traffic related to subscriber device 205), and perform an action (e.g., associated with QoS, accounting, and/or lawful intercept) based on the information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable MAN devices to peer with CDN devices, thereby allowing more efficient content delivery (e.g., based on consuming fewer network resources, providing content from a closer geographic location, etc.). Additionally, implementations described herein may enable a BNG device to assign particular functionality to a CDN-PE device and receive information based on the CDN-PE implementing the functionality. In this way, implementations described herein may enable disaggregated BNG functionality while enabling a BNG device to retain visibility and control into network traffic associated with subscriber devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
one or more processors to:
receive, from a broadband network gateway, information that assigns a function related to network traffic associated with a content delivery network and a subscriber device,
the function, assigned by the information received from the broadband network gateway, including providing information associated with the network traffic to the broadband network gateway,
the first device being associated with a metropolitan area network,
the first device being associated with an Ethernet virtual private network configuration, and
the broadband network gateway being associated with an Internet service provider network;
execute the function with regard to the network traffic based on the information that assigns the function,
the first device to receive the network traffic from the content delivery network, and
the first device to provide the network traffic to the subscriber device in a manner that bypasses the broadband network gateway; and
provide, to the broadband network gateway, the information associated with the network traffic based on executing the function,
the broadband network gateway to manage a subscriber session of the subscriber device based on the information associated with the network traffic that was provided to the subscriber device in the manner that bypasses the broadband network gateway.

2. The first device of claim 1, where the one or more processors are further to:
determine a bandwidth usage value associated with the network traffic; and
where the one or more processors, when providing the information associated with the network traffic, are to:
provide the information associated with the network traffic based on the bandwidth usage value,
the broadband network gateway to adjust a bandwidth usage value of other network traffic associated with the subscriber device based on the bandwidth usage value.

3. The first device of claim 1, where the one or more processors are further to:
provide, to the broadband network gateway, mirrored network traffic; and
where the one or more processors, when providing the information associated with the network traffic, are to:
provide the information associated with the network traffic based on the mirrored network traffic.

4. The first device of claim 1, where the one or more processors are further to:
provide, to the broadband network gateway, statistical information associated with the network traffic,
the broadband network gateway to determine a bandwidth usage limit value based on the statistical information;
receive, from the broadband network gateway, information that identifies the bandwidth usage limit value; and
enforce the bandwidth usage limit value in association with other network traffic related to the subscriber device.

5. The first device of claim 1, where the one or more processors are further to:
receive, from the broadband network gateway, information that identifies a priority indicator value; and
modify the network traffic based on the priority indicator value.

6. The first device of claim 1, where the one or more processors are further to:
establish an access node control protocol session with the broadband network gateway; and
where the one or more processors, when providing the information associated with the network traffic, are to:
provide the information associated with the network traffic using the access node control protocol session.

7. The first device of claim 1, where the one or more processors are further to:
determine a byte count associated with the network traffic; and
where the one or more processors, when providing the information associated with the network traffic, are to:
provide the information associated with the network traffic based on the byte count.

8. A non-transitory computer-readable medium storing instructions, the instructions comprising:
one or more instructions that, when executed by one or more processors of a first device, cause the one or more processors to:
receive, from a broadband network gateway, information that assigns a function related to network traffic associated with a subscriber device,
the function, assigned by the information received from the broadband network gateway, including providing information associated with the network traffic to the broadband network gateway,
the first device being associated with a metropolitan area network, and
the broadband network gateway being associated with an Internet service provider network that is different than the metropolitan area network;
execute the function in association with the network traffic based on the information that assigns the function,
the first device to provide the network traffic to the subscriber device in a manner that bypasses the broadband network gateway, and
the network traffic not being provided via the Internet service provider network; and provide, to the broadband network gateway, the information associated with the network traffic based on executing the function.

9. The non-transitory computer-readable medium of claim 8, where the one or more instructions, when executed by the one or more processors, further cause the one or more processors to:
provide, to the broadband network gateway, information that identifies a bandwidth usage value associated with the network traffic,
the broadband network gateway to determine that the bandwidth usage value satisfies a threshold value; and
receive, from the broadband network gateway, information that identifies a bandwidth usage limit value based on the bandwidth usage value satisfying the threshold value.

10. The non-transitory computer-readable medium of claim 8, where the one or more instructions, when executed by the one or more processors, further cause the one or more processors to:
provide, to the broadband network gateway, information that identifies a network metric value associated with the network traffic,
the broadband network gateway to determine that the network metric value satisfies a threshold value; and
receive, from the broadband network gateway, information that identifies a bandwidth usage limit value based on the network metric value satisfying the threshold value.

11. The non-transitory computer-readable medium of claim 8, where the one or more instructions, when executed by the one or more processors, further cause the one or more processors to:
determine a bandwidth usage value associated with the network traffic; and
where the one or more instructions, that cause the one or more processors to provide the information associated with the network traffic, cause the one or more processors to:
provide the information associated with the network traffic based on the bandwidth usage value,
the broadband network gateway to adjust a bandwidth usage of other network traffic based on the bandwidth usage value, and
the other network traffic to be provided via the Internet service provider network.

12. The non-transitory computer-readable medium of claim 8, where the one or more instructions, when executed by the one or more processors, further cause the one or more processors to:
provide, to the broadband network gateway, mirrored network traffic associated with the network traffic.

13. The non-transitory computer-readable medium of claim 8, where the one or more instructions, when executed by the one or more processors, further cause the one or more processors to:
receive Ethernet virtual private network configuration information; and
where the one or more instructions, that cause the one or more processors to receive the information that assigns the function, cause the one or more processors to:
receive the information that assigns the function based on the Ethernet virtual private network configuration information.

14. The non-transitory computer-readable medium of claim 8, where the one or more instructions, when executed by the one or more processors, further cause the one or more processors to:
receive Ethernet virtual private network configuration information;
receive network layer reachability information, associated with the subscriber device, based on the Ethernet virtual private network configuration information; and
provide, to a boundary router, the network layer reachability information,
the boundary router being associated with a content delivery network, and
the first device to receive the network traffic from the content delivery network.

15. A method, comprising:
receiving, by a first device, information that assigns a function related to network traffic associated with a content delivery network,
the function, assigned by the information, including providing information associated with the network traffic to a broadband network gateway;
executing, by the first device, the function based on the information that assigns the function,
the first device to receive the network traffic from the content delivery network, and
the first device to provide the network traffic to a subscriber device in a manner that bypasses the broadband network gateway; and
providing, by the first device and to the broadband network gateway, information associated with the network traffic based on executing the function,
the broadband network gateway to manage a subscriber session associated with the subscriber device based on the information associated with the network traffic that was provided to the subscriber device in the manner that bypasses the broadband network gateway.

16. The method of claim 15, further comprising:
receiving Ethernet virtual private network configuration information;
receiving network layer reachability information based on the Ethernet virtual private network configuration information,
the network layer reachability information being associated with the subscriber device; and
where receiving the information that assigns the function comprises:
receiving the information that assigns the function based on the network layer reachability information.

17. The method of claim 15, further comprising:
establishing a peering session with an autonomous system boundary router (ASBR),
the ASBR being associated with the content delivery network;
providing, to the ASBR, network layer reachability information associated with the subscriber device;
receiving, from the ASBR, the network traffic; and
where implementing the function comprises:
implementing the function based on receiving the network traffic.

18. The method of claim 15, further comprising:
determining a bandwidth usage value associated with the network traffic; and
where providing the information associated with the network traffic comprises:

providing the information associated with the network traffic based on the bandwidth usage value.

19. The method of claim 15, further comprising:
determining statistical information associated with the network traffic,
the statistical information including a byte count associated with the network traffic; and
where providing the information associated with the network traffic comprises:
providing the information associated with the network traffic based on the statistical information.

20. The method of claim 15, further comprising:
providing, to the broadband network gateway, mirrored network traffic; and
where providing the information associated with the network traffic comprises:
providing the information associated with the network traffic based on the mirrored network traffic.

* * * * *